Inventor
Robert P. Lewis
By Strauch & Hoffman
Attorneys

Patented Feb. 27, 1940

2,192,088

UNITED STATES PATENT OFFICE 2,192,088

NEEDLE BEARING DIFFERENTIAL

Robert P. Lewis, Toledo, Ohio, assignor to Spicer Manufacturing Corporation, Toledo, Ohio, a corporation of Virginia Application March 25, 1937, Serial No. 133,081

6 Claims. (Cl. 184—11)

This invention relates to differential gearing and more particularly to that type of differential gearing wherein power is transmitted to side gears, carried by aligned shafts, through pinion gears, rotatably mounted on trunnion portions of a spider element which is supported in a frame structure housing the foregoing mechanism and driven by a ring gear.

Mechanisms of this general type are well known in the art and take numerous forms. A very common type of failure of differentials of this kind is due to the seizure of the pinion bearings. The pinions are generally formed of hardened steel as are the trunnion portions of the spider elements and when plain bearings of this type are properly lubricated fairly satisfactory operating results are obtained, particularly at low speeds. Nevertheless, plain bearings of this type frequently give trouble, due to seizure of the pinions on the trunnion portions, and when such occurs the differential is practically destroyed. In view of the wide use of gearing of this nature, especially in the automotive drive field, where unfavorable conditions of both load and speed are encountered, considerable thought has been given to this problem but hitherto no wholly satisfactory solution has been reached.

I have discovered that if the pinion gears are journaled on their respective trunnion elements by means of anti-friction bearings comprising a plurality of elongated roller elements, having a length many times their diameter, arranged between the relatively rotatable parts with an axial and circumferential clearance exceeding ordinary bearing clearances, and constantly supplied with a bath of lubricant, seizure of the gears on said pinions is entirely obviated and satisfactory operation is assured even under the severest of load and speed conditions.

It is therefore a major object of my invention to provide an improved type of differential mechanism wherein the pinion gears are journaled on properly arranged and lubricated elongated roller bearings of the aforementioned type so that seizure of said gears is absolutely prevented.

It is also an object of my invention to provide, in a differential of the type just mentioned, a novel means for supplying lubricant to the roller bearings journaling the pinion gears so that said bearings are certain to be constantly bathed in a body of lubricant.

As pinion gears in differential mechanisms are subjected to a radial thrust suitable thrust receiving surfaces are generally provided on the differential casing and gears to sustain the same and it is of course necessary to provide lubricant for the same. This is conveniently done by directing lubricant escaping from the pinion gear bearings to the aforementioned thrust receiving surfaces. However, in order to insure a constant supply of lubricant within the anti-friction bearings journaling the pinion gears it is essential that the rate at which lubricant is supplied to these bearings exceeds the rate of escape therefrom.

Therefore, it is another object of my invention to provide in a differential gearing a novel bearing structure together with means for constantly supplying lubricant thereto with said bearing arranged to pass lubricant therethrough to thrust surfaces carried by the pinion gears and differential casing and with said lubricant supplying means designed to feed lubricant to the bearing structure at a rate greater than the rate of escape therefrom whereby the bearing structure will be at all times flooded with lubricant.

More specifically it is an object of my invention to provide, in a differential gearing wherein the pinon gears are journaled on their respective trunnion elements by means of needle-like roller bearings, a novel means associated with the trunnion elements for catching lubricant, thrown outwardly from the central portion of the casing under the action of centrifugal force, and directing the same into the pinion gear bearings.

In bearings of the type above mentioned the rollers have freedom of axial movement and when used to journal pinion gears on the trunnion elements of a differential such movement must be arrested at predetermined limits in each of two radial directions, due to the tendency of centrifugal force to throw the rollers out of the pinions and to the action of gravity on said rollers tending to cause them to fall inwardly.

It is, accordingly, a still further object of my invention to provide, in a differential gearing of the present type including pinion gears journaled on trunnion elements by means of a plurality of axially movable rollers, novel thrust receiving elements which are arranged so as to properly limit the axial movement of said rollers in each direction and at the same time are formed to permit lubricant to circulate through said bearings.

In differential mechanisms of this type a casing structure supports the moving parts and the same is commonly hollow and provided with suitable apertures permitting the entrance of lubricant thereinto. In operation such lubricant is thrown outwardly under the action of centrifugal force thus reaching the pinion gears and their bearings. The trunnion elements are usually carried by a so-called spider element located centrally of the casing and most of the lubricant which reaches the pinion gear bearings travels along the outer surfaces of the element to the inner ends of the trunnions carried thereby. In order that all of such lubricant reach the pinion gear bearings it is essential that these surfaces be unobstructed and smooth. Furthermore, for most efficient operation, these surfaces should not project laterally beyond the trunnion surfaces thereby permitting a portion of the lubricant travelling therealong to be thrown off without reaching the trunnions or lubricant catching means.

It is, therefore, a still further object of my invention to provide in a differential of the present type, a novel spider or trunnion supporting element which has smooth and unobstructed outer surfaces preferably arranged so as to not project laterally beyond the surfaces of the trunnion elements.

These and other objects will become apparent from the following detailed description of preferred embodiments of my invention and appended claims when read in conjunction with the accompanying drawings wherein:

Figure 1a is a transverse sectional view of a portion of a pinion gear and trunnion showing the bearing structure and arrangement in detail.

Figure 1:
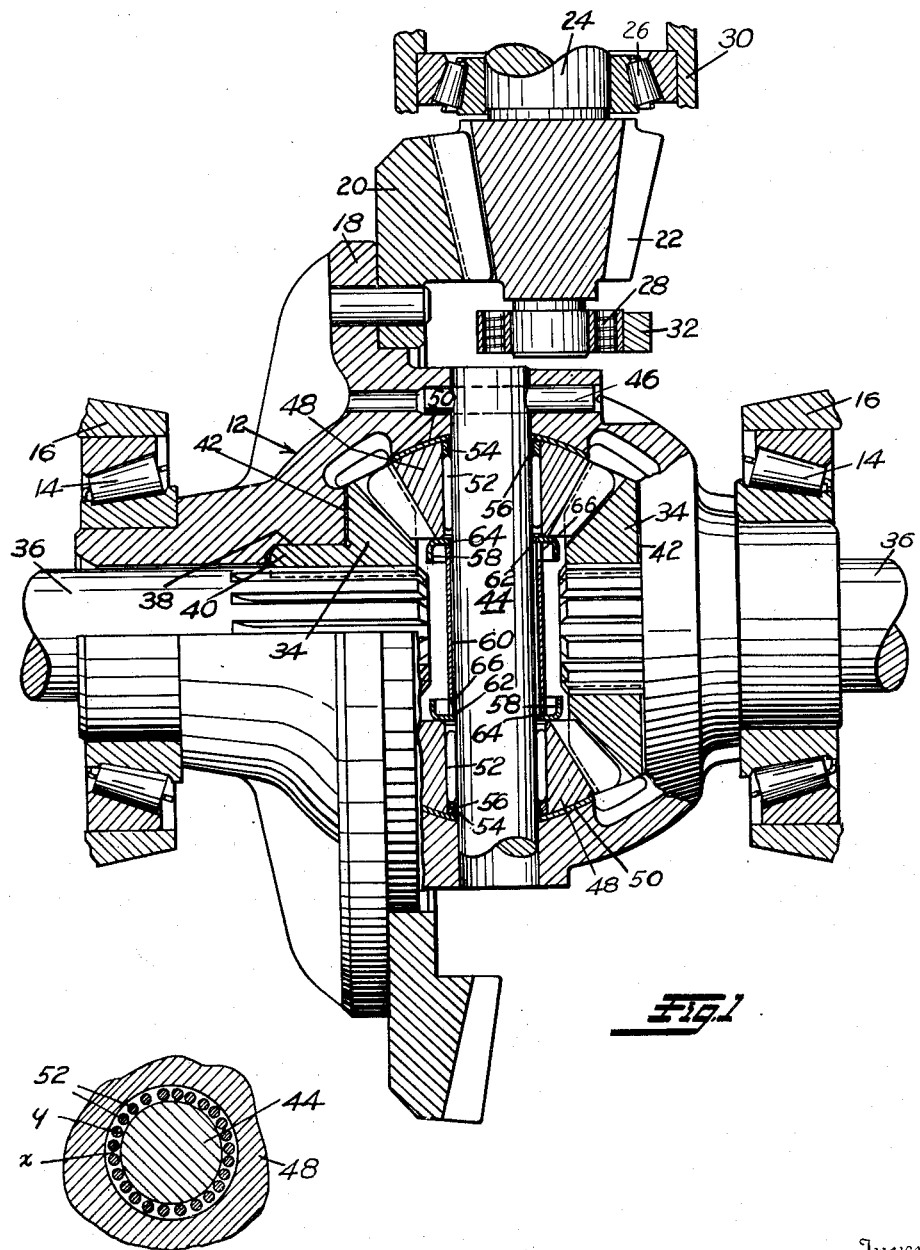
Figure 1 is a partial view of a differential mechanism of the two pinion type, partly in section and partly in elevation, and embodying my improved bearing arrangement and the lubricating means therefor.

Referring to the drawings and particularly to Figure 1 thereof a two-pinion differential is shown with casing 12 journaled at its ends in bearings 14—14 supported in projecting portions 16—16 of an outer casing, not shown. Casing 12 is integral and provided with a flange 18 on which is secured, by bolts not shown, a ring gear 20 meshing with a bevel gear 22 carried by drive shaft 24 which is journaled on bearings 26—28 supported in portions 30—32 of the outer casing. Casing 12 is hollow and open on opposite sides as shown to permit assembly of the internal mechanism therein.

Side gears 34—34 are splined to shafts 36—36 and journaled in cylindrical recesses 38 in casing 12 by sleeve portions 40. Hardened thrust washers 42—42 are interposed between the back faces of gears 34—34 and flat surfaces provided on casing 12. A pin 44 is secured at its ends in casing 12 by means of a dowel 46 and journaled on this pin are pinion gears 48—48 meshing with gears 34—34 and having outer spherical surfaces engaging hardened thrust receiving washers 50—50 interposed between said spherical surfaces and complementary surfaces provided on casing 12.

The foregoing differential mechanism is conventional and operates in the usual manner to provide a differential drive for shafts 36—36 from drive shaft 24 as will be readily understood.

Turning now to Figure 1a the manner of journaling the pinion gears 48—48 on the pin 44 is shown, a sleeve of needle-like roller elements 52, which have a length many times their diameters, see Figure 1, is interposed between said pinions and the pin so as to have freedom of axial movement. Clearance $y$, exceeding ordinary bearing clearances, is provided between the sleeve of rollers and their races, provided by the outer surface of pin 44 and walls of the openings in gears 48.

The needle-like rollers are designed and arranged so that substantial circumferential clearance $x$ exists between the rollers, a space being left in the sleeve somewhat less than the diameter of one needle-like roller. Accordingly the rollers are not so snugly arranged as to impair the freedom of each roller to turn at times on its own axis, though the sleeve of rollers at other times, depending on the load, acts as a sliding sleeve bearing providing a multiplicity of line contacts with the races.

It will be appreciated that, in a roller bearing having clearances, such as just described, the individual rollers are capable of skewing. Such action of the rollers, if it occurs, is destructive of the bearing. Practical experience has shown, however, that said action never occurs if the bearing is constantly adequately lubricated, the long needle-like rollers then automatically slipping into a position at which their axes exactly parallel the axis of rotation. The absolute need for proper lubrication is thus apparent. In order to insure the aforementioned automatic alignment the rollers are highly polished. It will be understood that the clearance $y$ is considerably exaggerated in Figure 1a, and is in practice only a few thousandths of an inch.

Hardened thrust elements 54—54 are positioned within the pinion gears outwardly of these roller elements and serve to limit outward movement thereof under the action of centrifugal force. Elements 54 are snugly received by the pinion gears on their outer surfaces while their internal diameters are slightly greater than the external diameter of pin 44 thus providing an annular opening 56 for a purpose later described.

Mounted on the pin 44 are inwardly facing cup-shaped members 58—58 held in spaced relation and against the inner faces of gears 48—48 by a spacing sleeve 60. Members 58—58 are provided with central openings 62 and ribs 64 center these openings with respect to the pin 44 so that a substantially annular passage is formed therebetween. As will be seen the outer surfaces of members 58—58 form thrust surfaces preventing inward movement of rollers 52—52 beyond a certain point. Sleeve 60 is notched at 66 adjacent the aforementioned members 58—58 for a purpose now to be explained.

As previously noted rollers 52—52 form bearings for pinions 48—48 so that the same are antifrictionally journaled on pin 44. Under normal loads the assembly of rollers moves as a unit about the axis of pin 44 thereby forming a floating sleeve bearing. However, when a heavy load is applied thereto the particular rollers sustaining the same are caused to rotate about their own individual axis more or less in the manner of the usual roller bearings. In either case the pinion gears are nicely journaled on the pin and cannot "freeze" thereto or "seize" thereon. As has previously been mentioned rollers 52—52 provide restricted spaces between them and thus capillary action will tend to draw oil therebetween to keep the same always lubricated. Due to their peculiar action, just noted, bearings of this type are peculiarly adapted for the present use as the pinion gears are subjected to varying and suddenly applied loads.

As previously mentioned it is essential to the proper operation of bearings of this type that they be constantly supplied with lubricant and an important feature of my invention resides in the means employed to obtain this result. In the present instance this is accomplished by the cup-shaped elements 58—58 together with the passages provided by notches 66—66 and opening 62.

In operation casing 12 is rotated by bevel gear 22 through ring gear 20 and lubricant splashed into the interior thereof from the outer casing is thrown outwardly by centrifugal force thus lubricating the gears 34 and 48. A portion of this lubricant is caught by cup-shaped members 54—54 and passes through notches 66—66 and apertures 62—62 to the bearing rollers 52—52. Some of this lubricant leaks out through the annular space provided by element 54 and eventually reaches the spherical thrust surfaces of gears 48 and element 50 thus lubricating the same. As these surfaces are firmly pressed together such leakage will be comparatively slow and the rate thereof will be considerably less than the rate of supply to bearings 52—52. In this manner these bearings are at all times provided with an excess supply of lubricant and their proper operation is assured.

It is also to be noted that the pin 44 presents a smooth and uninterrupted outer surface so that lubricant traveling therealong will not be deflected out of its path and will certainly reach the cup-shaped lubricant collecting elements 58—58.

Figure 2:
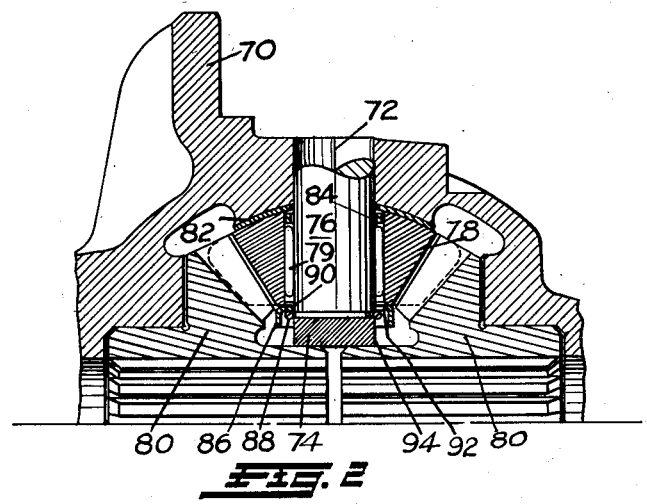
Figure 2 is a sectional view of a portion of a four pinion differential also embodying my improved bearing arrangement and novel lubricating means.

Figure 2 shows my improved pinion gear bearing structure and lubricating means applied to a four pinion differential. Casing 70 is split at 72 and clamped between the mating halves thereof is a supporting or spider element 74 provided with four angularly disposed trunnion elements 76, only one of which is shown. Pinion gear 78, which corresponds with pinion gears 48—48 above described, is journaled on the trunnion 76 by means of bearing rollers 79 and meshes with side gears 80—80 suitably journaled in casing 70. A spherical thrust washer 82 is interposed between complementary spherical thrust surfaces on casing and gear 78 in the manner just explained in connection with Figure 1.

An annular thrust element 84 is arranged in the pinion 78 and an inwardly facing cup-shaped element 86 is held by a snap ring 88, engaging circumferential arranged projections 90 extending from the edges of a central aperture 92, against the inner face of gear 78. It will, of course, be understood that all the trunnion elements are likewise provided with pinion gears in the aforementioned manner. The inner body portion 94 of spider 74 is formed to present smooth uninterrupted outer surfaces so that lubricant traveling therealong will not be deflected away from the cup-shaped elements 86. Also the thickness of this portion is substantially equal to the thickness of trunnions 76 for a similar reason.

The operation of this arrangement is similar to that of Figure 1 and is briefly as follows. Lubricant traveling outwardly along element 74 is caught by the cup-shaped elements 86—86 and directed through the aperture 92 to the rollers 79. Some of this lubricant slowly leaks out through the annular space provided by the thrust element 84 to the end thrust bearing formed by washer 82 and the spherical end of pinion 78. However, as in the first case, the rate of leakage is less than the rate of supply and hence an excess amount of lubricant is at all times presented to rollers 79 thus insuring their proper operation.

Axial movement of rollers 79 is limited by thrust element 84 and the outer face of element 86 in the same manner as in the modification shown in Figure 1.

Figure 3:
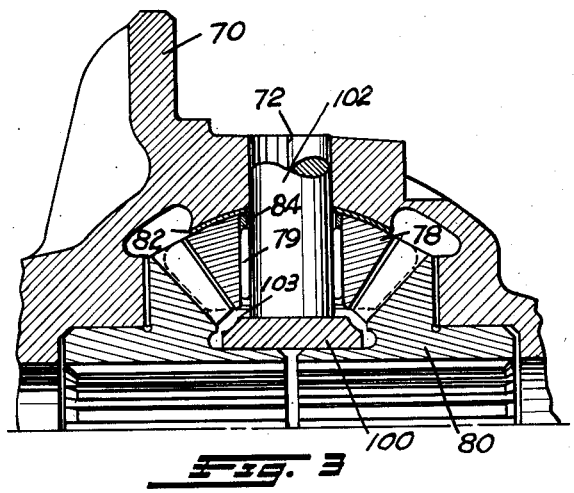
Figure 3 is a view similar to Figure 2 but showing my improved bearing arrangement applied to a conventional four pinion differential.

In Figure 3 a further modified construction is shown which is similar to that illustrated in Figure 2 with the exception that a conventional spider element is used and the cup-shaped lubricant catching elements are omitted. The parts of this structure which correspond exactly with similar parts of the modification just described are designated by the same reference characters and no further description is deemed necessary. In this case, however, a spider 100 has an enlarged or thickened central portion carrying the usual angularly disposed trunnion elements 102. A shoulder 103 formed by the trunnions serves to limit inward movement of rollers 79 under the action of gravity, outward movement being limited by thrust element 84 as previously described. In this arrangement lubricant traveling outwardly along the smooth and uninterrupted outer surfaces of spider 100 is thrown against the meshing teeth of gears 78 and 80 and a considerable quantity thereof enters the annular space between pinion 78 and spider 100 and hence reaches rollers 79. Due to the relatively slower rate of leakage of lubricant from the outer end of the pinion bearings, as above explained, this quantity of lubricant is always sufficient to keep the rollers 79 well supplied and proper operation thereof is assured.

While the first two arrangements wherein the cup-shaped lubricant catching members are provided are preferable the last arrangement has been found to give satisfactory results and provides means for applying my improved bearing and lubricating arrangement in conventional differential mechanisms by simply replacing the usual pinions with pinions 78, rollers 79 and thrust ring 84.

Figure 4:
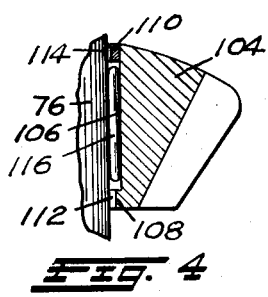
Figures 4, 5 and 6 are section views of modified thrust element constructions which may be used in connection with my improved differential pinion bearing arrangement.
Figure 5:
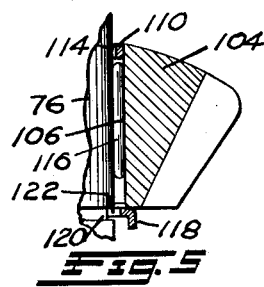
Figure 6:
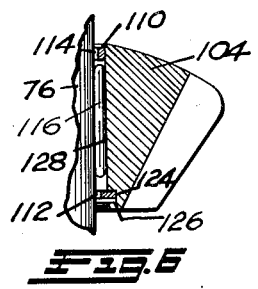

In Figures 4, 5 and 6 several modified forms of roller thrust rings and lubricant catching or collecting members are shown. In Figure 4 pinion 104 has a central bore 106 shouldered at 108 and provided with a thrust ring 110. Rollers 116, of the aforementioned type, are assembled between ring 110 and shoulder 108 while annular spaces 112—114 permit lubricant to enter and leave the bearing in the manner previously explained. In Figure 5 a cup-shaped member 118 is snapped into a groove 120 in the trunnion 76 and serves as a collecting means for lubricant which flows through a plurality of notches 122 to the rollers 116. In Figure 6 a thrust receiving ring 124 is fitted in a groove 126 on the bore 128 of pinion 104 with its inner edge spaced from trunnion 76 to provide a lubricant passage 112.

The foregoing modified pinion structures can be applied to the trunnions of either a two pinion or a four pinion differential as will readily be understood and in each case provide thrust elements for limiting axial movement of the rollers and at the same time are arranged to permit circulation of an adequate supply of lubricant through the pinion bearings. The modifications of Figures 4 and 6 are especially designed for use in the arrangement shown in Figure 3 where no cup-shaped lubricant catching device is employed but can be used in the structures shown in Figures 1 and 2, if desired. The form shown in Figure 5 may be used only with the differential mechanisms shown in Figures 1 and 2 and when used with Figure 1 the spacing sleeve 60 may be omitted.

From the foregoing it is seen that I have provided novel differential mechanism having improved bearing structures of the roller bearing type which prevent seizure of the pinion gears on the trunnions and in which axial movement of the rollers of said bearings is definitely limited. Furthermore, my improved differential mechanism embodies novel means for supplying lubricant to said bearings through certain of the thrust receiving elements as well as leading lubricant therefrom to other parts of the pinion gears in such a manner that the quantity of lubricant supplied to said bearings is always greater than that taken therefrom whereby a constant supply of lubricant is present in said bearings.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a differential mechanism, a casing, trunnion means carried by said casing and extending radially inwardly therefrom, pinion gears provided with needle-like roller bearings journaled on said trunnions, and lubricant collecting means for catching centrifugally thrown lubricant and directing it to said bearings, said means comprising inwardly facing cup-shaped elements secured to said trunnions adjacent the inner sides of said gears and provided with passage means communicated with said bearings, said cup-shaped elements being adapted to receive lubricant thrown outwardly from the center of said casing and direct the same through said passage means to said bearings.

2. In a differential mechanism, a casing, a spider element comprising a cylindrical member extending transversely of and secured at its ends to said casing, pinion gears journaled on said member adjacent an inner wall of said casing, needle-like roller bearing means associated with said gears and said member, lubricant collecting and feeding devices, mounted on said member adjacent to said gears and comprising inwardly facing cup-shaped elements encircling said trunnions and provided with passage means communicating with said bearings, for collecting lubricant from the center of said casing and feeding it directly to said bearing means.

3. In a differential mechanism, a casing, a spider element comprising a cylindrical member extending transversely of and secured at its ends to said casing, pinion gears journaled on said member adjacent an inner wall of said casing, needle-like roller bearing means associated with said gears and said member, lubricant collecting and feeding devices, mounted on said member adjacent to said gears and comprising inwardly facing cup-shaped elements encircling said trunnions and provided with passage means communicated with said bearings, for directing lubricant from the center of said casing and feeding it directly to said bearing means, and a spacing member for holding said devices in assembled position with their outer surfaces in contact with said gears.

4. In a differential mechanism, a casing, a spider element comprising a central portion carrying a plurality of angularly disposed radially extended trunnions, the outer end of said trunnion being secured in said casing, pinion gears journaled on said trunnion, a floating sleeve of rollers between said gears and trunnion, a ring-like member cooperating with said gears and trunnions outwardly of said rollers against which the latter are adapted to centrifugally bear, said member providing for a restricted rate of lubricant flow from the space between said gears and trunnion, and lubricant collecting means associated with the inner end of each of said trunnions for directing lubricant to the sleeve of rollers associated with the trunnion at a rate in excess of said restricted rate, said means comprising inwardly facing cup-shaped elements secured to said trunnions adjacent to and inwardly of said gears.

5. In a differential mechanism, a casing, a spider element mounted in said casing and having a ring-like central portion providing trunnions thereon, pinion gears rotatably mounted on said trunnions, needle bearings associated with said gears and trunnions for journaling the former on the latter, means encircling said trunnions outwardly of said needle bearings providing for the restricted flow of lubricant from the space between said gears and trunnions, lubricant collecting and feeding means secured to each of said trunnions adjacent said gears and provided with passage means communicating with said bearings, said means comprising inwardly facing cup-shaped elements arranged to collect lubricant thrown from the center of said casing along the outer surfaces of said spider element, under the action of centrifugal force, and direct the same to said needle bearings at a rate materially in excess of said restricted rate, said outer surfaces being shaped to provide an unobstructed path of travel for said lubricant.

6. In a differential mechanism, a casing, a spider element mounted in said casing and provided with trunnions, gears mounted on said trunnions, bearing means for said gears comprising a plurality of elongated rollers interposed between said gears and trunnions, retainer elements associated with said gears and said trunnions for limiting axial movement of said rollers, at least one of said retainer elements being arranged to direct lubricant traveling outwardly along said spider element into said bearing means.

ROBERT P. LEWIS.